United States Patent
Conner

(10) Patent No.: US 6,921,191 B2
(45) Date of Patent: Jul. 26, 2005

(54) INJECTION/EXTRUDER SCREW

(75) Inventor: Randy Conner, Hayward, WI (US)

(73) Assignee: Concor Tool and Machinery, Hayward, WI (US)

( * ) Notice: Subject to any disclaimer, the term of this patent is extended or adjusted under 35 U.S.C. 154(b) by 120 days.

(21) Appl. No.: 10/226,960

(22) Filed: Aug. 23, 2002

(65) Prior Publication Data

US 2004/0037160 A1 Feb. 26, 2004

(51) Int. Cl.$^7$ ............................................. B29B 7/42
(52) U.S. Cl. ........................................................ 366/89
(58) Field of Search ................... 366/89, 323; 198/661; 425/204, 208, 209

(56) References Cited

U.S. PATENT DOCUMENTS

| | | | | |
|---|---|---|---|---|
| 2,505,125 A | * | 4/1950 | Heinz | |
| 3,191,229 A | * | 6/1965 | Vanzo | |
| 3,431,599 A | * | 3/1969 | Fogelberg | 366/89 |
| 3,572,644 A | * | 3/1971 | Poncet | |
| 3,685,804 A | * | 8/1972 | Stansfield | 366/89 |
| 3,698,693 A | * | 10/1972 | Poncet | |
| 3,762,693 A | * | 10/1973 | DeBoo et al. | 366/89 |
| 4,124,308 A | * | 11/1978 | Sokolow | 366/89 |
| 4,173,445 A | * | 11/1979 | McKelvey et al. | 366/89 |
| 4,408,888 A | * | 10/1983 | Hanslik | |
| 5,044,489 A | * | 9/1991 | Barsk et al. | 198/666 |
| 5,490,725 A | * | 2/1996 | Behrens et al. | 366/89 |
| 5,540,900 A | * | 7/1996 | Poncet | 366/323 |
| 5,655,835 A | * | 8/1997 | Pham et al. | |
| 6,129,873 A | * | 10/2000 | Shelby et al. | 425/208 |
| 6,331,069 B1 | * | 12/2001 | Putti | |
| 6,513,963 B2 | * | 2/2003 | Derezinski | 366/89 |

FOREIGN PATENT DOCUMENTS

| | | | |
|---|---|---|---|
| DE | 19904227 A1 | * | 8/2000 |
| JP | 8-318561 | * | 12/1996 |
| JP | 10-286823 | * | 10/1998 |
| JP | 2003-231121 | * | 8/2004 |

OTHER PUBLICATIONS

Concor Tool and Machine, Inc.—10 prints of various concor screws which transition down.

* cited by examiner

Primary Examiner—Charles E. Cooley
(74) Attorney, Agent, or Firm—Barnes & Thornburg

(57) ABSTRACT

The present invention concerns a screw for moving plastic through a barrel in a direction of flow from a drive to a tip. The screw has a shaft having opposing first and second ends, a drive located on the first end of the shaft, a tip located on the second end of the shaft, and a flight helically extending around the shaft. The shaft also has a section of decreasing diameter in the flow direction and a section of increasing in diameter in the flow direction.

4 Claims, 2 Drawing Sheets

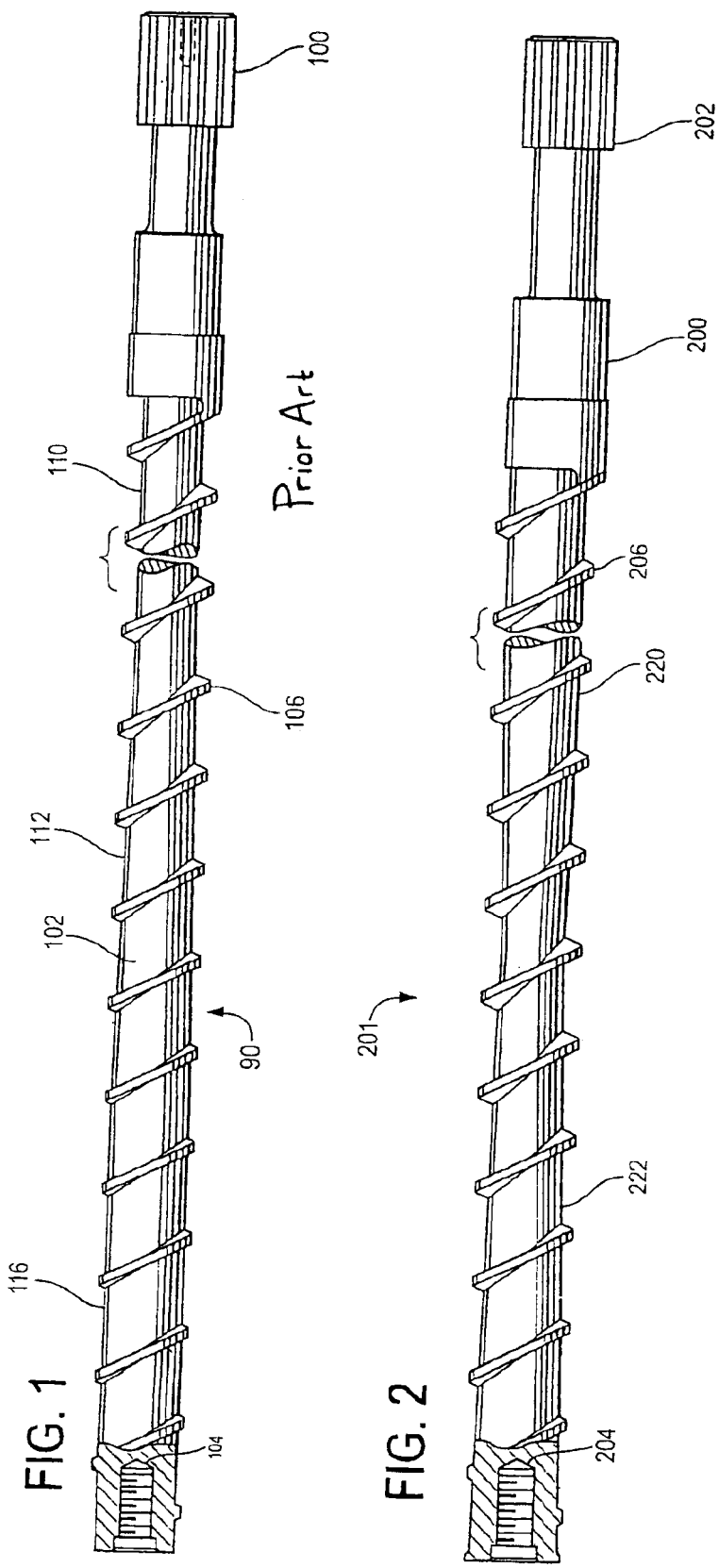

INJECTION/EXTRUDER SCREW

BACKGROUND OF THE INVENTION

The present invention concerns an extruder or injection screw for use inside a heated barrel for processing material through the barrel. The body of the screw is tapered in design. The first section of the screw body has a downward taper in the direction of material flow which is followed by a body section which has an upward tapered in the direction of material flow.

SUMMARY OF THE INVENTION

In standard screw designs, the use of blended materials which consist of plastic and some other material such as metal which is harder in nature has adversely affected the life of the screw. While an average screw may last for up to 4–6 years or more when used with unfilled materials, the recent use of metal filled materials has reduced the life of the screw to as little just days in some applications.

The present invention increases the life of the screw when used with metal filled materials. It does so by providing a screw which is uniquely tapered. The screw of the present invention has a feed section that tapers downwardly in the direction of material flow. The downward taper is followed by a section which has an upward taper in the direction of material flow. Tapering the screw in this manner creates time for the filled material to melt or wet out prior to being subjected to the compressive forces needed to properly work the material prior to molding.

DESCRIPTION OF THE DRAWINGS

These and other features, objects and advantages of the present invention will become apparent from the following description and drawings wherein like reference numerals represent like elements in several views, and in which:

FIG. 1 is a side view of a standard screw.

FIG. 2 is a side view of the present invention.

DESCRIPTION OF THE PREFERRED EMBODIMENT

Figure 3:
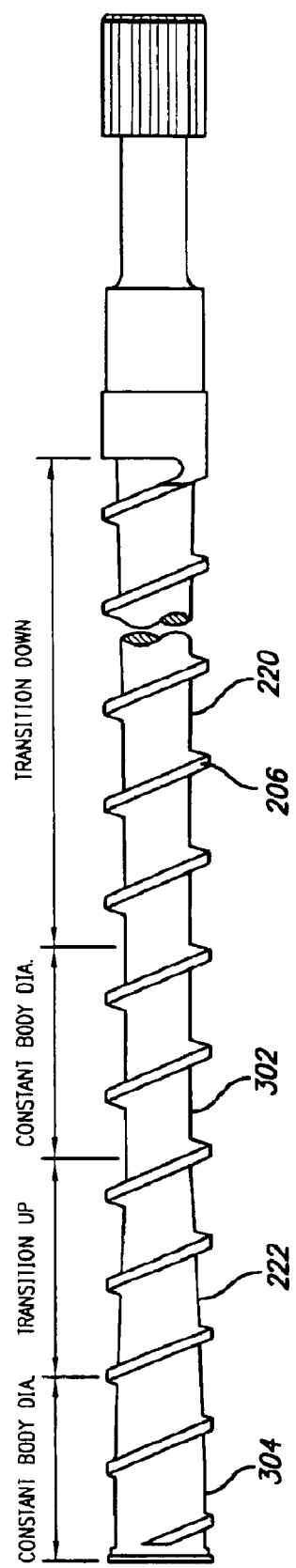
FIG. 3 is a side view of an alternate embodiment of the present invention.

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

FIG. 1 illustrated a standard screw 90 for processing plastic through a heated barrel. Screw 90 has a drive 100, a body 102, threads for a tip 104 and a flight 106 which is helically wrapped around body or shaft 102 and has a constant diameter. As is also shown, the diameter of shaft 102 varies in several locations. At feed section 110, the diameter of the shaft is the smallest. At the transition section 112, the diameter of the shaft gradually increases until reaching the largest diameter section, the metering section 116. The diameter at metering section 116 is again constant but is considerably larger than the diameter at feed section 110.

The shaft diameter varies to create different pressures inside the barrel to assist in working the plastic which needs to be converted from a solid to a liquid. At the feed section, the solid plastic is introduced and heated. This needs to be a low pressure area since at this point in the process the plastic is in a solid state. As the plastic melts, its lubricity increases thus allowing the diameter of the shaft to increase. This puts the material under a compressive force so as to insure a homogenous melt and to help remove trapped gasses.

While the design shown in FIG. 1 works well and has been known to last for many years, when harder materials such a carbide and stainless steal etc. are blended into the plastic, the design of FIG. 1 loses its durability. It has been found that the life of the flight may only be a few days when used with this type of material mixture. The present invention solves this problem.

As shown in FIG. 2, the present invention provides a screw 201. Screw 201 has a shaft 200, a drive 202, a tip 204, and a flight 206 which is helically wrapped around the shaft.

Drive 202 may be a spline drive, keyway, flat drive or any other connection that permits the screw to be turned by a drive mechanism. The tip may also be attached by threads to shaft 200. To accommodate the high solid content, shaft 200 is tapered in configuration. At the start of the flight, the screw has a downwardly tapered section 220 which is created by decreasing the shaft diameter in the direction of flow which runs from the drive to the tip. On a second end of the shaft, a section 222 is provided which is upwardly tapered. This is created by increasing the shaft diameter. Section 222 is located after section 220.

While section 222 is shown as immediately proceeding section 220 or transitioning from Section 220, the present invention is not limited to such a configuration. As show in FIG. 3, a section of constant diameter 302 may be located between sections 220 and 222. In addition, there could also be a section of generally constant diameter 304 after section 222.

FIG. 3 illustrates an extruder screw having a first section 220 of decreasing shaft diameter followed by a second section 302 of constant diameter and a third section 222 of increasing diameter. Within the first section 220, the shaft of the extruder screw begins to taper in diameter at the start of the flight 206 at the first end of the extruder screw. The shaft continues to decrease in diameter along the flights in the first section 220 from the initial flights for a first length. The decreasing taper of the shaft can be clearly seen in FIG. 3.

Following the first section 220 of the extruder screw is a constant diameter section 302 extending for a second length. The shaft within the constant diameter section 302 maintains a constant diameter to move the melted plastic along a portion of the length of the screw. Following the constant diameter section 302 is an increasing diameter section 222 extending for a third length. The increasing diameter section 222 of the extruder screw increases in diameter along the flights following the constant diameter section 302 to the end of the shaft. The first and third lengths of the sections 220 and 222 are each greater than the length of the section 302.

In use, the downward taper decreases the compressive force inside the barrel. This is needed to accommodate the solid content of the plastic so as to avoid having the flight damaged by the material. This allows time for the plastic to melt or wet out. Once this occurs, the material may then be compressed to complete mixing and to remove air without placing harmful stresses on the flight.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. An extruder screw adapted to be associated with an extruder, said screw comprising:
   a shaft with opposing first and second ends, said first end having a feed section;
   said shaft including a flight helically extending around said shaft;
   said shaft having a first portion beginning to taper within said feed section of said screw and decreasing in diameter in the feed section; said first portion extending for a first length along said shaft;
   said shaft having a second portion of constant diameter; said second portion directly following said first portion and extending for a second length along said shaft;
   said shaft having a third portion of increasing diameter; said third portion directly following said second portion and extending for a third length along said shaft to said second end;
   wherein said first and third lengths are each greater than said second length.

2. The extruder screw of claim 1 wherein said extruder screw is adapted for use within a barrel that is heated to melt plastic moved by said screw within said barrel.

3. An extruder screw adapted for moving plastic through a barrel comprising:
   a shaft having opposing first and second ends;
   a drive located approximate said first end of said shaft;
   a flight helically extending around and along the length of said shaft;
   said shaft having a first portion beginning to taper at the start of the flight at the first end of said screw and decreasing in diameter; said first portion extending for a first length along said shaft;
   said shaft having a second portion of constant diameter; said second portion directly following said first portion and extending for a second length along said shaft;
   said shaft having a third portion of increasing diameter; said third portion directly following said second portion and extending for a third length along said shaft to said second end;
   wherein said first and third lengths are each greater than said second length.

4. The extruder screw of claim 3, wherein said extruder screw is adapted for use within a barrel that is heated to melt plastic moved by said extruder screw within said barrel.

* * * * *